United States Patent
Sokolov et al.

(10) Patent No.: US 10,382,416 B1
(45) Date of Patent: Aug. 13, 2019

(54) TECHNIQUES FOR DETECTING SHARED DEVICES

(71) Applicant: Symantec Corporation, Mountain View, CA (US)

(72) Inventors: Ilya Sokolov, Boston, MA (US); Kevin B. Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 154 days.

(21) Appl. No.: 14/753,788

(22) Filed: Jun. 29, 2015

(51) Int. Cl.
*H04L 29/00* (2006.01)
*H04L 29/06* (2006.01)
*H04L 29/08* (2006.01)

(52) U.S. Cl.
CPC .......... *H04L 63/08* (2013.01); *H04L 67/143* (2013.01)

(58) Field of Classification Search
CPC .............................. H04L 63/08; H04L 67/143
USPC ................................................................ 726/6
See application file for complete search history.

(56) References Cited

U.S. PATENT DOCUMENTS

| 6,839,760 B1* | 1/2005 | Walters | H04L 69/22 707/E17.115 |
| 2013/0290711 A1* | 10/2013 | Rajkumar | H04L 9/0861 713/168 |
| 2014/0122564 A1* | 5/2014 | Arora | H04L 65/4084 709/203 |

FOREIGN PATENT DOCUMENTS

CN    101039310 A  *  9/2007

OTHER PUBLICATIONS

Stack Exchange / Information Security /2013 / https://security.stackexchange.com/questions/34880/is-it-safe-to-allow-users-multiple-login-at-different-browsers-computers/ pp. 3.*

P. Eckersley "How Unique is Your Web Browser", Electronic Frontier Foundation, Proceedings of the Privacy Enhancing Technologies Symposium (PETS 2010), Springer Lecture Notes in Computer Science, pp. 1-19.

* cited by examiner

*Primary Examiner* — Jeffrey C Pwu
*Assistant Examiner* — Michael D Anderson
(74) *Attorney, Agent, or Firm* — Meyertons Hood Kivlin Kowert and Goetzel PC; Rory D. Rankin (57) ABSTRACT

Techniques for detecting shared devices are disclosed. In one particular exemplary embodiment, the techniques may be realized as a method for detecting shared devices comprising receiving, using a shared computer detection component, information about a connection to a website from a user device, identifying, using the shared computer detection component, one or more characteristics associated with the connection from the user device, determining, in the event there is sufficient data based on the one or more characteristics associated with the connection from the user device, whether the user device is a shared device, and calculating a first responsive action in the event it is determined that the user device is a shared device.

19 Claims, 7 Drawing Sheets

TECHNIQUES FOR DETECTING SHARED DEVICES

FIELD OF THE DISCLOSURE

The present disclosure relates generally to network security and, more particularly, to techniques for detecting shared devices.

BACKGROUND OF THE DISCLOSURE

Despite the prevalence of mobile devices and laptops, public or shared computers may still be used. Public or shared computers can be found in libraries, schools, hotel business centers, and many times are the only option to get Internet access when travelling outside of the country. However, there are well-known risks with browsing on a public computer. For example, users may forget to logout and leave their sessions active, data from a browsing session may be left in cache after the user leaves, users might accidentally check "keep me signed in" or "remember me" options, and other people nearby might peek, photograph, or record things on the screen.

In view of the foregoing, it may be understood that there may be significant problems and shortcomings associated with current security technologies for addressing shared or public computers.

SUMMARY OF THE DISCLOSURE

Techniques for detecting shared devices are disclosed. In one particular exemplary embodiment, the techniques may be realized as a method for detecting shared devices comprising receiving, using a shared computer detection component, information about a connection to a website from a user device, identifying, using the shared computer detection component, one or more characteristics associated with the connection from the user device, determining, in the event there is sufficient data based on the one or more characteristics associated with the connection from the user device, whether the user device is a shared device, and calculating a first responsive action in the event it is determined that the user device is a shared device.

In accordance with other aspects of this particular embodiment, the data based on the one or more characteristics associated with the connection may comprise a login name.

In accordance with further aspects of this particular embodiment, determining whether the user device is a shared device may comprise determining whether a number of different identified login requests from the user device meets a specified threshold.

In accordance with additional aspects of this particular embodiment, determining the number of different identified login requests from the user device may comprise hashing one or more login names, and counting a number of different hashed login names of the one or more hashed login names.

In accordance with further aspects of this particular embodiment, the techniques may further include storing, locally associated with the shared device, a unique anonymous indicator of the login name based on the hashed login name.

In accordance with other aspects of this particular embodiment, the techniques may include storing, remote from the shared device, a unique anonymous indicator of the login name based on the hashed login name and an identifier of the user device.

In accordance with additional aspects of this particular embodiment, determining different identified login requests may comprise dividing the hashed login name by a specified number; obtaining a modulo of the division; and setting a bit corresponding to the obtained modulo.

In accordance with further aspects of this particular embodiment, the one or more characteristics of the connection may comprise an IP Address associated with the user device.

In accordance with other aspects of this particular embodiment, the one or more characteristics of the connection may comprise one or more characteristics of a browser associated with the user device.

In accordance with additional aspects of this particular embodiment, determining whether the user device is a shared device may comprise determining an IP address associated with the user device, identifying one or more web browser characteristics of a web browser associated with the user device, counting a number of unique sessions at the website, wherein the sessions are associated with the IP address and the web browser having the one or more web browser characteristics; and determining whether the number of unique sessions exceeds a specified threshold.

In accordance with other aspects of this particular embodiment, the techniques may further comprise performing the first responsive action.

In accordance with further aspects of this particular embodiment, the first responsive action may include at least one of: shortening a duration of a session associated with the website, using no caching headers for one or more HTTP responses, disabling a user option to remain signed in, disabling a user option to be remembered, limiting an amount of personally identifiable information displayed as a default, limiting an amount of sensitive personal information displayed as a default, limiting an amount of financial information displayed as a default, requiring additional authentication for a transaction, disabling functionality allowing restoration of a backup, disabling functionality allowing deletion of content, providing a warning to the user via a mobile device associated with the user, requiring an authentication from the user via a mobile device associated with the user, denying access to the website, logging the user out, terminating a session at the website, notifying an administrator, deleting browser history on logout, and logging one or more events associated with the connection.

In accordance with additional aspects of this particular embodiment, the techniques may further include determining that the data based on the one or more characteristics associated with the connection from the user device indicates a potential shared device, and determining a second responsive action in the event that the data based on the one or more characteristics associated with the connection from the user device is insufficient to determine that the user device is a shared device.

In accordance with other aspects of this particular embodiment, determining that the data based on the one or more characteristics associated with the connection from the user device indicates a potential shared computer may comprise determining that a number of connections from a same IP address exceeds a specified threshold.

In accordance with further aspects of this particular embodiment, determining that the data based on the one or more characteristics associated with the connection from the user device indicates a potential shared computer may comprise determining that an IP address of the user device is associated with a geo-location not historically associated with the login.

In accordance with additional aspects of this particular embodiment, the second responsive action may comprise at least one of: prompting the user to confirm whether a user device is a shared device, logging the user out, notifying an administrator, and logging one or more events associated with the connection.

In accordance with other aspects of this particular embodiment, the determination is performed by at least one of: a third party identification provider, a network security vendor, the website, a browser on the user device, and an agent resident on the user device.

In accordance with further aspects of this particular embodiment, the techniques may be realized as at least one non-transitory processor readable storage medium storing a computer program of instructions configured to be readable by at least one processor for instructing the at least one processor to execute a computer process for performing the method.

In another particular embodiment, the techniques may be realized as an article of manufacture for detecting shared devices. The article of manufacture may comprise at least one non-transitory processor readable storage medium and instructions stored on the at least one medium. The instructions may be configured to be readable from the at least one medium by at least one processor and thereby cause the at least one processor to operate so as to receive, using a shared computer detection component, information about a connection to a website from a user device, identify, using the shared computer detection component, one or more characteristics associated with the connection from the user device, determine, in the event there is sufficient data based on the one or more characteristics associated with the connection from the user device, whether the user device is a shared device, and calculate a first responsive action in the event it is determined that the user device is a shared device.

In yet another particular embodiment, the techniques may be realized as a system for detecting shared devices comprising one or more computer processors communicatively coupled to a network. The one or more computer processors may be configured to receive, using a shared computer detection component, information about a connection to a website from a user device, identify, using the shared computer detection component, one or more characteristics associated with the connection from the user device, determine, in the event there is sufficient data based on the one or more characteristics associated with the connection from the user device, whether the user device is a shared device, and calculate a first responsive action in the event it is determined that the user device is a shared device.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
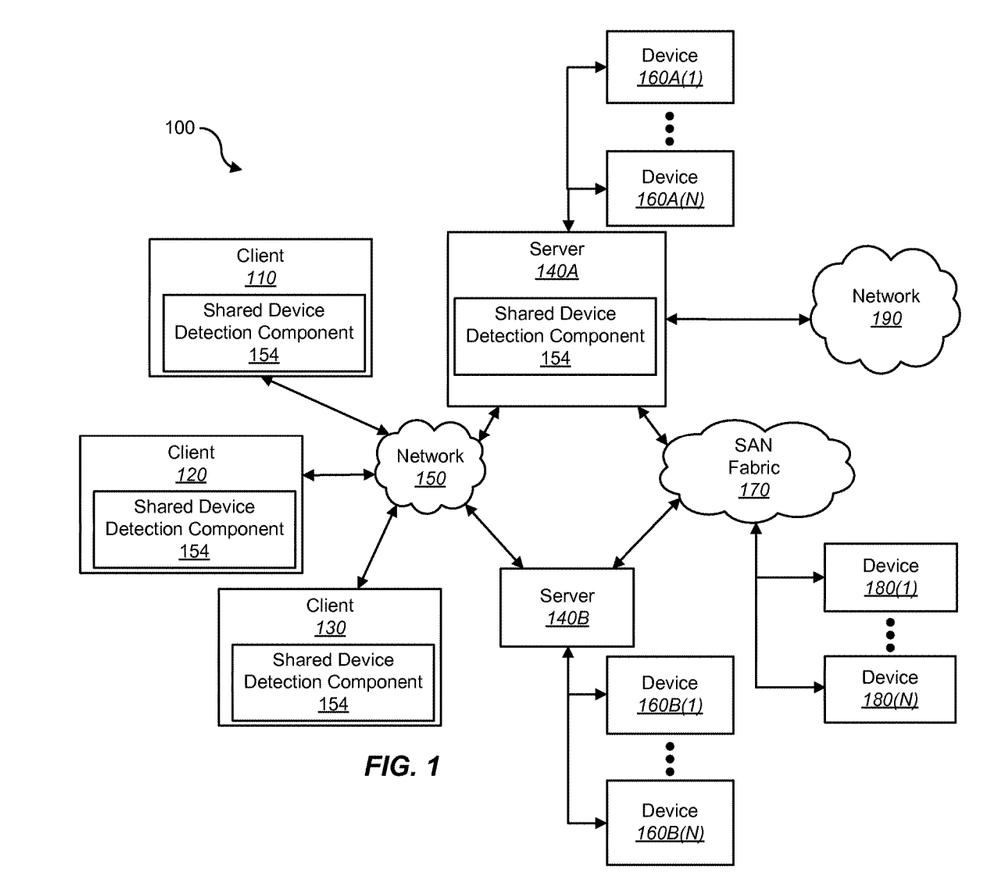
FIG. 1 shows a block diagram depicting a network architecture for detecting shared devices in accordance with an embodiment of the present disclosure.

FIG. 1 shows a block diagram depicting a network architecture 100 for detecting shared devices in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A (1)-(N), and server 140B may be communicatively coupled to storage devices 160B(1)-(N). Servers 140A and 140B may contain a management module (e.g., shared device detection component 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
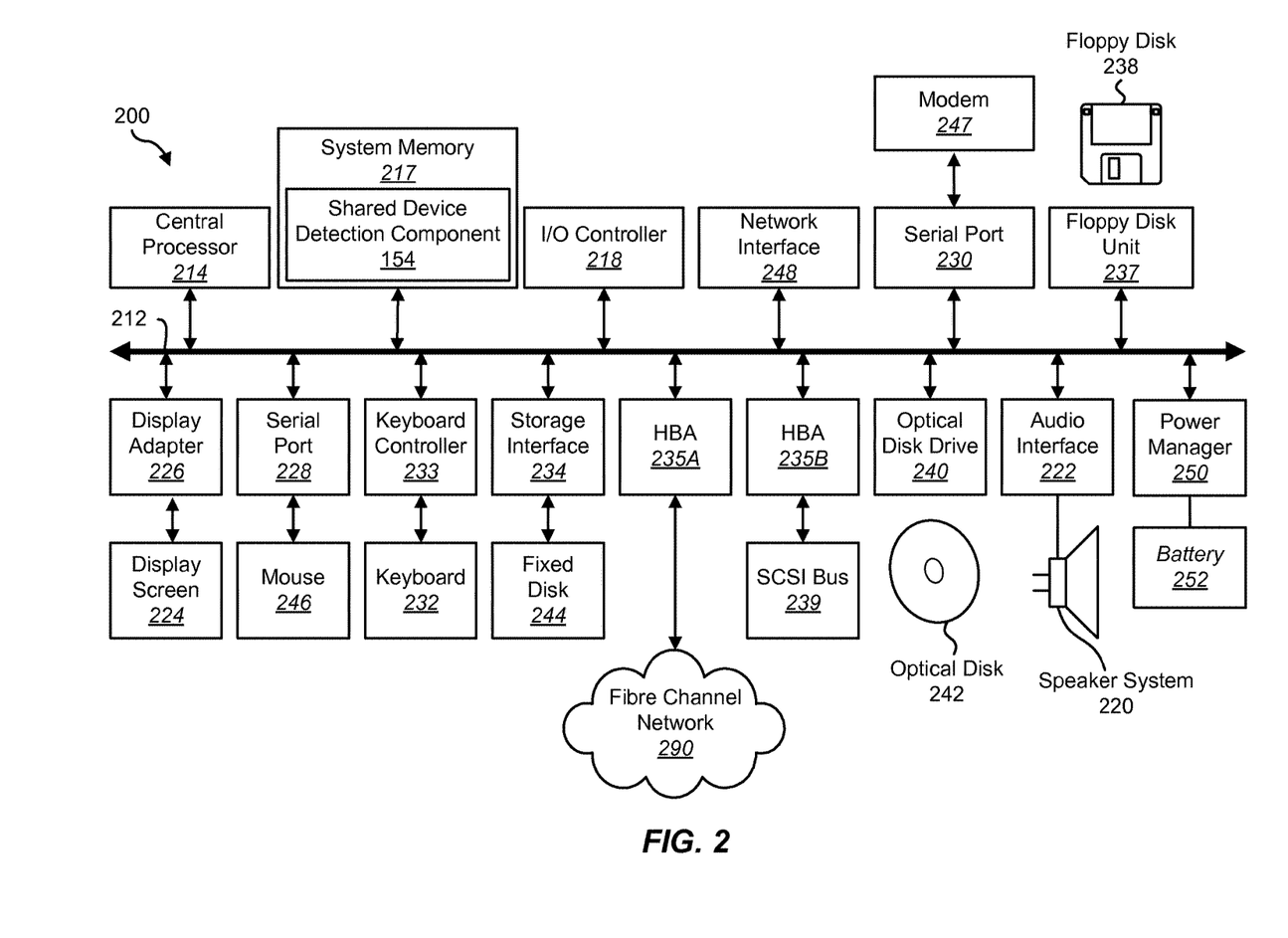
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for identification of security information such as, for example, shared device detection component 154. As illustrated, one or more portions of shared device detection component 154 may reside at a network centric location. For example, server 140A may be a server, a firewall, a gateway, or other network element that may perform one or more actions to identify security information. According to some embodiments, network 190 may be an external network (e.g., the Internet) and server 140A may be a gateway or firewall between one or more internal components and clients and the external network.

Shared device detection component 154 may detect use of a shared or public device (e.g., a computer, laptop, mobile device, or other computing device). A shared device may pose a risk not only on the client side (e.g., the shared device itself may be infected) but also to remote websites accessed and to users of those sites. For example, users may forget to logout and leave their sessions active, data from a browsing session may be left in cache after the user leaves, users might accidentally check "keep me signed in" or "remember me" options, and other people nearby might peek, photograph, or record things on the screen. These security risks may allow unauthorized users to gain access to accounts (e.g., financial, social, email, etc.), to obtain personal information (e.g., medical information, contacts, etc.), to obtain confidential information (e.g., account numbers, credit card numbers, etc.), to conduct purchases or transfers, and to perform other malicious or unwanted actions. Thus shared devices or computers may present a risk to websites, users of shared computers, and other parties.

Shared device detection component 154 may detect when a user is browsing on a public or shared computer. A public or shared computer may include, for example, computers, tablets, etc. in a library which may be generally available to members of the public as well as computers, mobile devices, tablets, etc. which may be available to multiple users on a more limited basis (e.g., computers in a school lab, at a training center, at testing center, at a hotel provided workspace, etc.). Shared device detection component 154 may utilize one or more methods to detect a shared or public computer and may be implemented by one or more parties. For example, an identification provider may offer a service or an interface for detecting public or shared computers. A website may also implement one or more portions of shared device detection component 154 to detect public computers accessing the website. In some embodiments, a website may interface with an identification provider or a network security provider for assistance in detecting a public or shared computer. In some embodiments, one or more portions of shared device detection component 154 may be implemented by one or more of: a browser on the user device, an Operating System (O/S) component, circuitry on a webserver and/or user device, and an agent resident on the user device. In one or more embodiments, shared device detection component 154 may interface with a user mobile device and/or one or more portions of shared device detection component 154 may reside on a user mobile device.

Shared device detection component 154 may detect shared or public computers using one or more techniques. In some embodiments, shared device detection component 154 may determine that a computer is likely shared or public based on a number of users of the computer. The number of users may be specified and may be configurable. The number of users may also depend on other factors (e.g., a number of users per week, a number of users per month, a number of users per year, a location of the computer, one or more historical locations of the user, etc.). For example, if the computer is associated with the location of a library, a school computer lab, or other facility which may be more likely to have a shared or public computer, it may be a factor in determining whether the computer is shared or public. Shared device detection component 154 may allow a website or other remote computer to determine whether a computer is shared or public. For example, shared device detection component 154 may count a number of logins to website from a device. Unique logins may be identified by using one or more aspects. For example, unique login names may be counted. In some embodiments, a login name or other login identifier may be hashed or otherwise uniquely anonymized in order to reduce privacy concerns. A count of unique logins may be tracked at a user device or remotely (e.g., at a website, at a network security vendor, or at an identity provider). For example, a cookie may track unique logins to a website. In some embodiments, an indicator of a unique login may be used rather than data associated with the login, in order to reduce a data size for local storage (e.g., a cookie) or for transmission to a remote site. For example, a hash of a login name may be transformed to a more compact identifier by dividing the hash by a specified number, obtaining a modulo, and setting a bit corresponding to the modulo in an array. As an example, the specified number (N) may be the size of the array (e.g., N=20) and the hash of a login name may be divided by N, the modulo obtained, and a corresponding bit in an array of size N may be set. Shared device detection component 154 may determine that a computer is a shared computer if more than a specified number of bits (K) is set is an array. Other factors may be considered (e.g., a timeframe). For example, in some embodiments, multiple arrays or cookies may be used (e.g., a daily and a monthly cookie). If a monthly cookie indicates that a number of unique logins is less that a first specified number and a daily cookie indicates that a number of unique logins is more than a second specified number, shared device detection component 154 may not indicate an associated device as public or shared. In some embodiments, shared device detection component 154 may provide an indicator of certainty that a device is a public computer and a website may respond based on the level of certainty indicated.

To determine whether a computer is public or shared, shared device detection component 154 may determine first whether website accesses (e.g., logins, sessions, etc.) are coming from a same computer. In some embodiments, an identifier associated with a cookie may be used. If a cookie resides on a single computer and is used to track a number of unique logins, a website may retrieve a count of unique logins from the cookie during a session and may determine whether a computer is likely shared or public. In some embodiments, an identifier associated with a computer may be used.

Identifying a unique computer remotely from a website based on network traffic to the website may be challenging. For example, if an IP address is used, the same IP address may sometimes be used by multiple computers (e.g., using Network Address Translation to map one public IP address to many private IP addresses). Thus, an IP address may not always be unique and other indicators may be used. For example, unique characteristics of a web browser associated with the user device may be paired with an IP address to identify a unique user device. Web browser characteristics (or a fingerprint of the browser) may include, for example, screen resolution, a font list, associated plug-ins and versions, time zone, MIME types, and user agent. In some embodiments, shared device detection component 154 may calculate a combination of one or more browser characteristics combined with an IP address may uniquely identify a browser. Shared device detection component 154 may combine a fingerprint of a web browser and an IP address with an indication of a number of users associated with the browser fingerprint/IP address pair (e.g., a count of logins from the pair) to provide an indication of whether a computer is shared.

Shared device detection component 154 may also use other indicators of whether a device is shared. For example, shared device detection component 154 may use a count of logins from an IP address in some cases as a weaker indicator to determine that a computer may be shared. In those cases, shared device detection component 154 may provide a different response than in a situation in which a stronger indicator of a public computer is made. For example, shared device detection component 154 may provide a prompt to a user asking for confirmation of whether or not a computer is shared. Another indicator of a public computer may be geo-location data. If a user typically logs into a website from one or more locations and a login from the same username is detected, shared device detection component 154 may prompt a user to inquire whether a current computer is shared. In some embodiments, a user who has an application associated with a website or with a security application installed on a mobile device may provide geo-location data via their mobile device to shared device detection component 154. If received geo-location data does not correspond with a location associated with a device associated with the web browser, shared device detection component 154 may take one or more responsive actions (e.g., prompt a user on a mobile device associated with the user, prompt a user at a user device, deny access to a website, restrict access to a website, etc.). In some embodiments, shared device detection component 154 may use geo-location data associated with an IP address of a device accessing a website and may take one or more responsive actions based on the geo-location data (e.g., prompt a user to confirm whether or not they are using a public computer if the geo-location data is more than a specified distance from one or more historical login locations, or if geo-location data indicates overseas data). If a user responds to a prompt or if it is otherwise determined that a computer is a public or shared device, in some embodiments shared device detection component 154 may set a cookie on the computer indicating that it is shared. In some embodiments, shared device detection component 154 may centrally maintain data indicating a degree of confidence that an computer is shared associated with an IP address, an IP address/browser fingerprint pair, or an unique indicator of a computer. In one or more embodiments, shared device detection component 154 may centrally maintain data associated with one or more (e.g., hashed login names) that may indicate historical geo-location data associated with the anonymized login indicators.

Shared device detection component 154 may provide one or more responsive actions. For example, shared device detection component 154 may perform one or more of: shortening a duration of a session associated with the website, using no caching headers for one or more HTTP responses, disabling a user option to remain signed in, disabling a user option to be remembered, requiring additional authentication for a transaction, disabling functionality allowing restoration of a backup, disabling functionality allowing deletion of content, providing a warning to the user via a mobile device associated with the user, requiring an authentication from the user via a mobile device associated with the user, denying access to the website, logging the user out, terminating a session at the website, notifying an administrator, deleting browser history on logout, and logging one or more events associated with the connection. Additionally, shared device detection component 154 may limit an amount of personally identifiable information or sensitive personal information displayed as a default. This may reduce a likelihood of "shoulder surfing" or allowing someone to look over a user's shoulder at sensitive or personal data while using a shared computer. For example, account numbers may be masked (e.g., xxxx-xxxx-xxxx-1234) to only show partial information such as the last four digits unless clicked on or expanded. Account details may be collapsed, masked, or otherwise hidden by default unless drilled down into by a user. Obtaining more detailed information may require re-authentication or additional authentication factors. In some embodiments, shared device detection component 154 may provide information to a user about potential risks and/or additional possible security measures (e.g., entering a token provided to a mobile device of a user, or using a different computer).

As discussed above, shared device detection component 154 may be implemented by a website provider and may be used to determine whether a website is being accessed from a public computer and to provide security accordingly. Shared device detection component 154 may also be implemented by a security provider or an identity provider (e.g., as a service or an API to a website). For example, a website may send data indicating a device (e.g., an IP address, a browser fingerprint/IP pair, etc.) and may receive an indication of whether or not a device is public or shared. The indication may, in some embodiments, include a degree of confidence. Other data may be provided (e.g., a location of a device, a reputation associated with a shared device, a level of security associated with a shared device, etc.).

Shared device detection component 154 may prevent forgotten logouts by disabling a user option to remain signed in and/or disabling a user option to be remembered. Shared device detection component 154 may also prevent the disclosure of data by clearing cache, using no caching headers, and/or clearing history.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, shared device detection component 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Storage interface 234 may provide access to storage via a plurality of interfaces such as, for example, Universal Serial Bus (USB). Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection, Bluetooth, Wi-Fi, Near Field Communication (NFC) or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
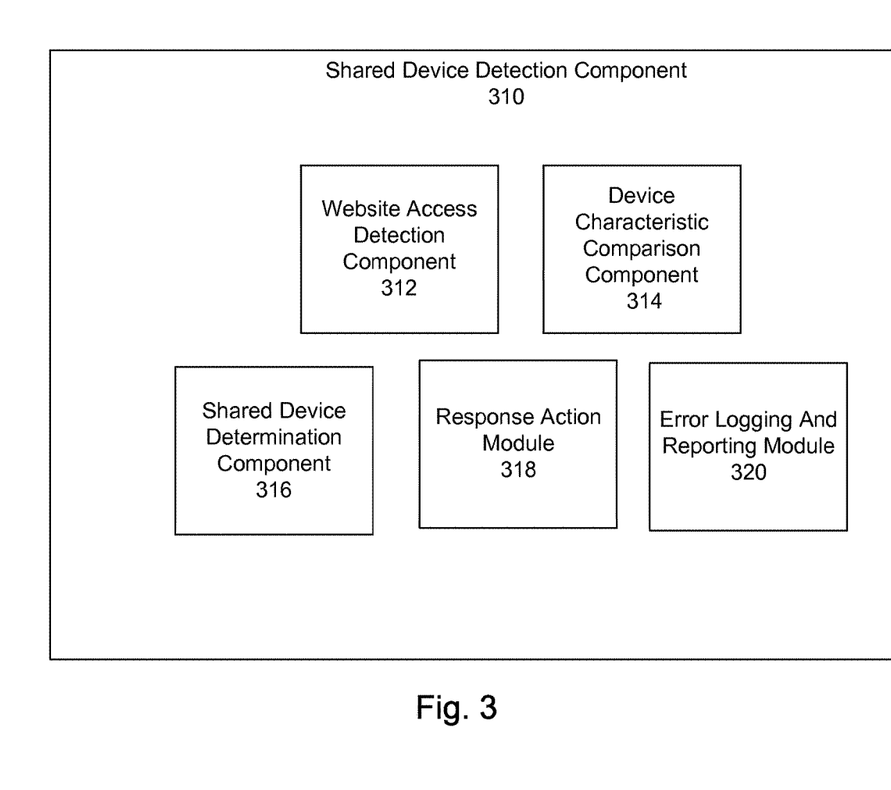
FIG. 3 shows a module for detecting shared devices in accordance with an embodiment of the present disclosure.

Referring to FIG. 3, there is shown a shared device detection component 310 in accordance with an embodiment of the present disclosure. As illustrated, the shared device detection component 310 may contain one or more components including login detection component 312, device characteristic component 314, shared device determination component 316, response action module 318, and error logging and reporting module 320.

The description below describes network elements, computers, and/or components of a system and method for detecting shared devices that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

In some embodiments, website access detection component 312 may count a number of logins to website from a device. Unique logins may be identified by using one or more aspects. For example, unique login names may be counted. In some embodiments, a login name or other login identifier may be hashed or otherwise uniquely anonymized in order to reduce privacy concerns. A count of unique logins may be tracked at a user device or remotely (e.g., at a website, at a network security vendor, or at an identity provider). For example, a cookie may track unique logins to a website. In some embodiments, an indicator of a unique login may be used rather than data associated with the login, in order to reduce a data size for local storage (e.g., a cookie) or for transmission to a remote site. For example, a hash of a login name may be transformed to a more compact identifier by dividing the hash by a specified number, obtaining a modulo, and setting a bit corresponding to the modulo in an array. As an example, the specified number (N) may be the size of the array (e.g., N=20) and the hash of a login name may be divided by N, the modulo obtained, and a corresponding bit in an array of size N may be set.

In some embodiments, device characteristic component 314 may use an IP address as an indicator of a device. Due to Network Address Translation (NAT), potential reassignment of IP addresses and other factors, an IP address may not always be unique and other indicators may be used. For example, unique characteristics of a web browser associated with the user device may be paired with an IP address to identify a unique user device. Web browser characteristics (or a fingerprint of the browser) may include, for example, screen resolution, a font list, associated plug-ins and versions, time zone, MIME types, and user agent. In some embodiments, device characteristic component 314 may calculate a combination of one or more browser characteristics combined with an IP address to uniquely identify a browser. Device characteristic component 314 may combine a fingerprint of a web browser and an IP address with an indication of a number of users associated with the browser fingerprint/IP address pair (e.g., a count of logins from the pair) to be used by shared device determination component 316 to provide an indication of whether a computer is shared.

Shared device determination component 316 may determine that a computer is a shared computer if more than a specified number of bits (K) is set is an array. Other factors may be considered (e.g., a timeframe). For example, in some embodiments, multiple arrays or cookies may be used (e.g., a daily and a monthly cookie). If a monthly cookie indicates that a number of unique logins is less that a first specified number and a daily cookie indicates that a number of unique logins is more than a second specified number, Shared device determination component 316 may not indicate an associated device as public or shared. In some embodiments, Shared device determination component 316 may provide an indicator of certainty that a device is a public computer and a website may respond based on the level of certainty indicated.

To determine whether a computer is public or shared, Shared device determination component 316 may determine first whether website accesses (e.g., logins, sessions, etc.) are coming from a same computer. In some embodiments, an identifier associated with a cookie may be used. If a cookie resides on a single computer and is used to track a number of unique logins, a website may retrieve a count of unique logins from the cookie during a session and may determine whether a computer is likely shared or public. In some embodiments, an identifier associated with a computer may be used. In one or more embodiments, a browser fingerprint/IP pair or other unique characteristic of a device may be provided by device characteristic comparison component 314.

Shared device determination component 316 may also use other indicators of whether a device is shared. For example, shared device determination component 316 may use a count of logins from an IP address in some cases as a weaker indicator to determine that a computer may be shared. Another indicator of a public computer may be geo-location data associated with a device accessing a website and/or associated with a user.

Response action module 318 may provide one or more responsive actions. For example, response action module 318 may perform one or more of: shortening a duration of a session associated with the website, using no caching headers for one or more HTTP responses, disabling a user option to remain signed in, disabling a user option to be remembered, requiring additional authentication for a transaction, disabling functionality allowing restoration of a backup, disabling functionality allowing deletion of content, providing a warning to the user via a mobile device associated with the user, requiring an authentication from the user via a mobile device associated with the user, denying access to the website, logging the user out, terminating a session at the website, notifying an administrator, deleting browser history on logout, and logging one or more events associated with the connection. Additionally, response action module 318 may limit an amount of personally identifiable information or sensitive personal information displayed as a default. This may reduce a likelihood of "shoulder surfing" or allowing someone to look over a user's shoulder at sensitive or personal data while using a shared computer. For example, account numbers may be masked (e.g., xxxx-xxxx-xxxx-1234) to only show partial information such as the last four digits unless clicked on or expanded. Account details may be collapsed, masked, or otherwise hidden by default unless drilled down into by a user. Obtaining more detailed information may require re-authentication or additional authentication factors. In some embodiments, response action module 318 may provide information to a user about potential risks and/or additional possible security measures (e.g., entering a token provided to a mobile device of a user, or using a different computer).

Error logging and reporting module 320 may produce logs, reports, or other information associated with detecting shared devices.

Figure 4:
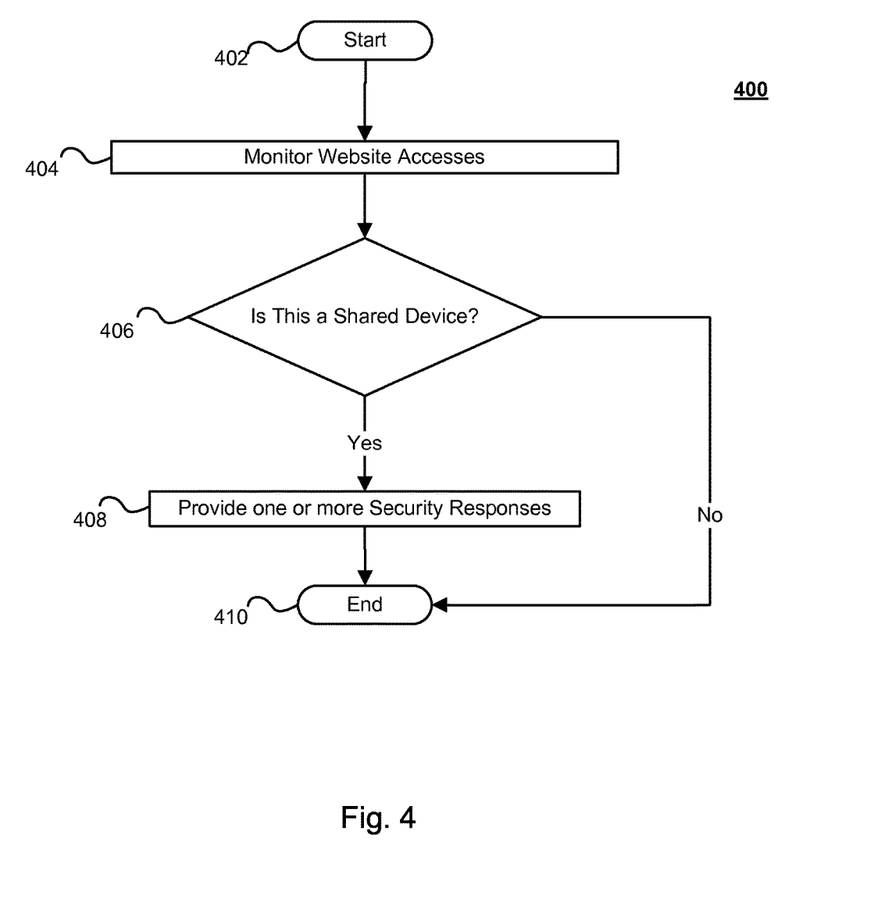
FIG. 4 depicts a method for detecting shared devices in accordance with an embodiment of the present disclosure.

Referring to FIG. 4, there is depicted a method 400 for detecting shared devices in accordance with an embodiment of the present disclosure. At block 402, the method 400 may begin.

At block 404, website accesses may be identified and data associated with a request, a user device, and/or a user may be gathered.

At block 406, a determination may be made as to whether a device is shared. In some embodiments, the determination may be based on a number of different users associated with a computer. This may be estimated or calculated in one or more ways. For example, unique identifiers associated with logins or sessions (e.g., hashed login names, hashed email addresses, etc.) may be counted per each identified unique machine. A unique machine may be determined by an identifier associated with a cookie on the machine, a browser fingerprint/IP address pair, or another identifier). In some embodiments, a user may be prompted to confirm whether or not a device is shared. In some embodiments, geo-location data associated with a device or a user may be used.

If a device is not shared the method may end at block 410. If a device is shared, the method may continue at block 408.

At block 408, one or more security responses may be performed. Responses may include one or more of: shortening a duration of a session associated with the website, using no caching headers for one or more HTTP responses, disabling a user option to remain signed in, disabling a user option to be remembered, requiring additional authentication for a transaction, disabling functionality allowing restoration of a backup, disabling functionality allowing deletion of content, providing a warning to the user via a mobile device associated with the user, requiring an authentication from the user via a mobile device associated with the user, denying access to the website, logging the user out, terminating a session at the website, notifying an administrator, deleting browser history on logout, and logging one or more events associated with the connection. Additionally, responses may include limiting an amount of personally identifiable information or sensitive personal information displayed as a default. This may reduce a likelihood of "shoulder surfing" or allowing someone to look over a user's shoulder at sensitive or personal data while using a shared computer. For example, account numbers may be masked (e.g., xxxx-xxxx-xxxx-1234) to only show partial information such as the last four digits unless clicked on or expanded. Account details may be collapsed, masked, or otherwise hidden by default unless drilled down into or otherwise requested by a user. Obtaining more detailed information may require re-authentication or additional authentication factors. In some embodiments, information may be provided to a user about potential risks and/or additional possible security measures (e.g., entering a token provided to a mobile device of a user, or using a different computer).

At block 416, the method 400 may end.

Figure 5:
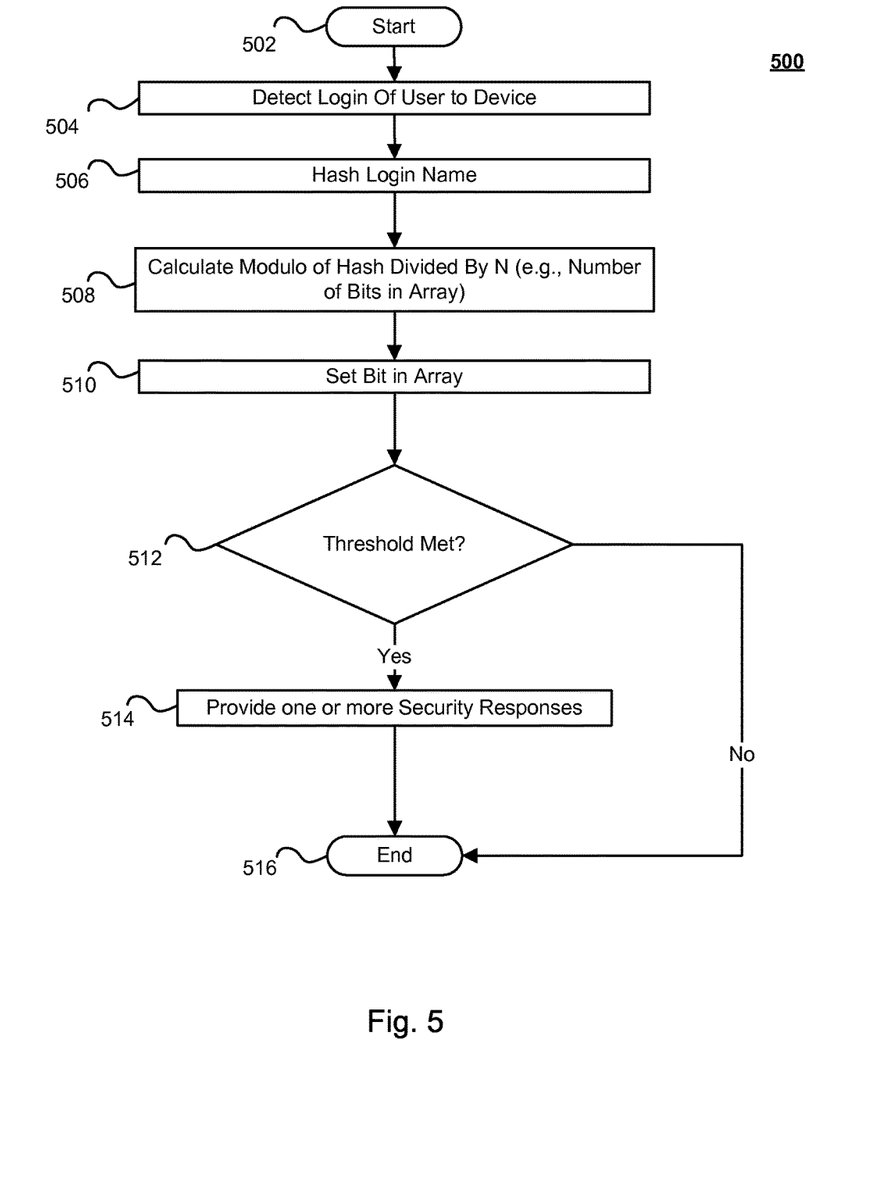
FIG. 5 depicts a method for detecting shared devices in accordance with an embodiment of the present disclosure.

Referring to FIG. 5, there is depicted a method 500 for detecting shared devices in accordance with an embodiment of the present disclosure. At block 502, the method 500 may begin.

At block 504, a login may be detected at website. One or more identifiers associated with a login may be gathered (e.g., a login name, an email address, etc.).

At block 506, a login name or other unique identifier of a user associated with a login may be hashed or otherwise uniquely anonymized.

At block 508, a unique anonymized identifier of a user associated with a login may be reduced in size for storage (e.g., on a cookie) or for transmission to a remote site. For example, a hash of a login name may be transformed to a more compact identifier by dividing the hash by a specified number, obtaining a modulo, and setting a bit corresponding to the modulo in an array. As an example, the specified number (N) may be the size of the array (e.g., N=20) and the hash of a login name may be divided by N and the modulo obtained. At block 510, a corresponding bit in an array of size N may be set.

At block 512, it may be determined whether a threshold has been met. For example, if a specified number of bits have been set in an array (e.g., representing unique users of a computer), the computer may be determined to be shared and the method may continue at block 514. If less than a specified number of bits has been set, the method may end at block 516.

At block 514, one or more security responses may be provided as described above in reference to block 408 of FIG. 4.

At block 516, the method 500 may end.

Figure 6:
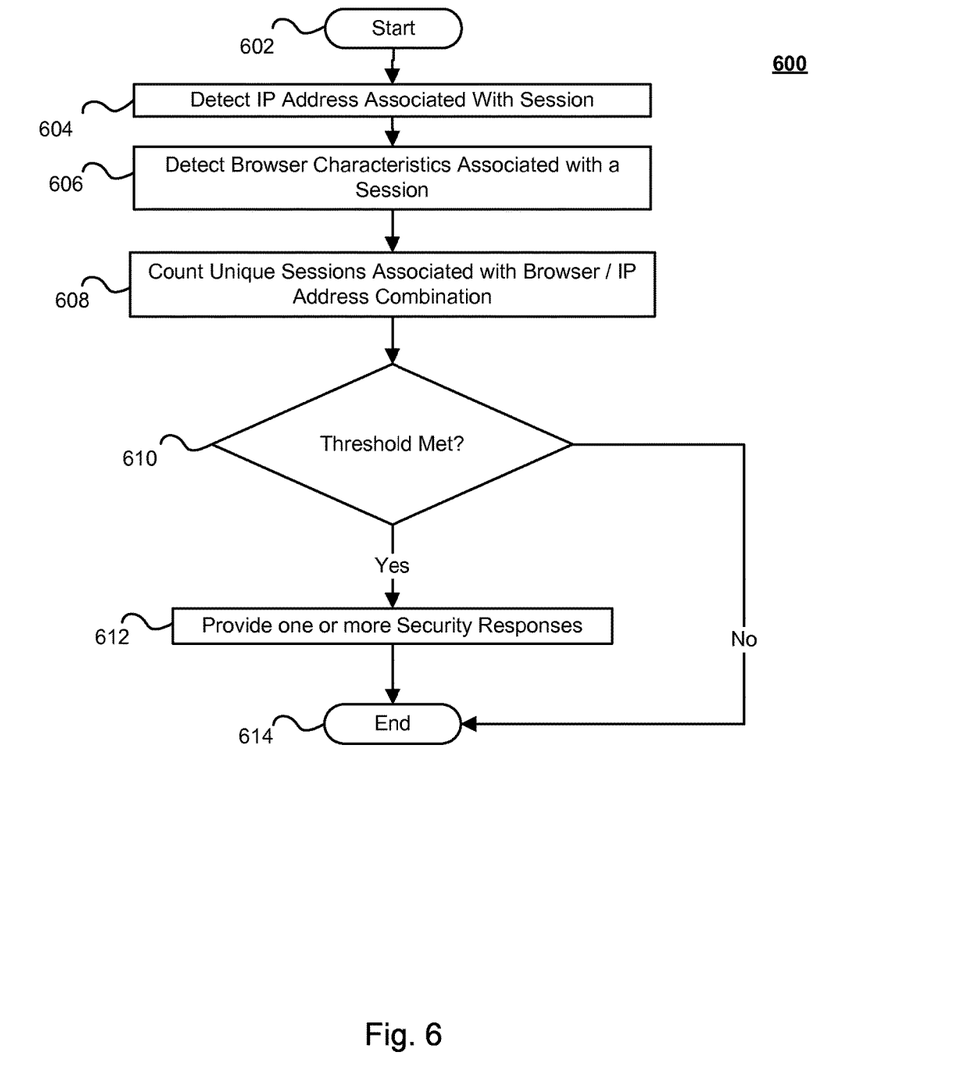
FIG. 6 depicts a method for detecting shared devices in accordance with an embodiment of the present disclosure.

Referring to FIG. 6, there is depicted a method 600 for detecting shared devices in accordance with an embodiment of the present disclosure. At block 602, the method 600 may begin.

At block 604, an IP address associated with a device initiating a session at a website may be detected. In some embodiments, another identifier associated with the device may be used.

At block 606, one or more web browser characteristics associated with a device instantiating a session at website may be gathered. Web browser characteristics (or a fingerprint of the browser) may include, for example, screen resolution, a font list, associated plug-ins and versions, time zone, MIME types, and user agent.

At block 608, a number of unique sessions associated with a browser fingerprint/IP address pair may be calculated and/or stored. In some embodiments, a browser fingerprint/IP address pair may be transmitted to a security provider, an ID provider, or another entity, which may provide an indication of whether or not a device is associated with a plurality of users.

At block 610, it may be determined whether a threshold has been met (e.g., is a number of users greater than a specified number of users?). Other factors may be considered such as, for example, a timeframe in which the unique users used the computer. A longer time period may require a higher number of users, a short time period (e.g., a day) may be discounted as an anomaly or one time spike, etc. Other factors may also include geo-location data associated with the connection, geo-location data associated with a user, current geo-location data of a device associated with a user, etc. If a threshold is met, the method may continue at block 612. If a threshold is not met, the method may end at block 614.

At block 612, one or more security responses may be provided as described above in reference to block 408 of FIG. 4.

At block 614, the method 600 may end.

Figure 7:
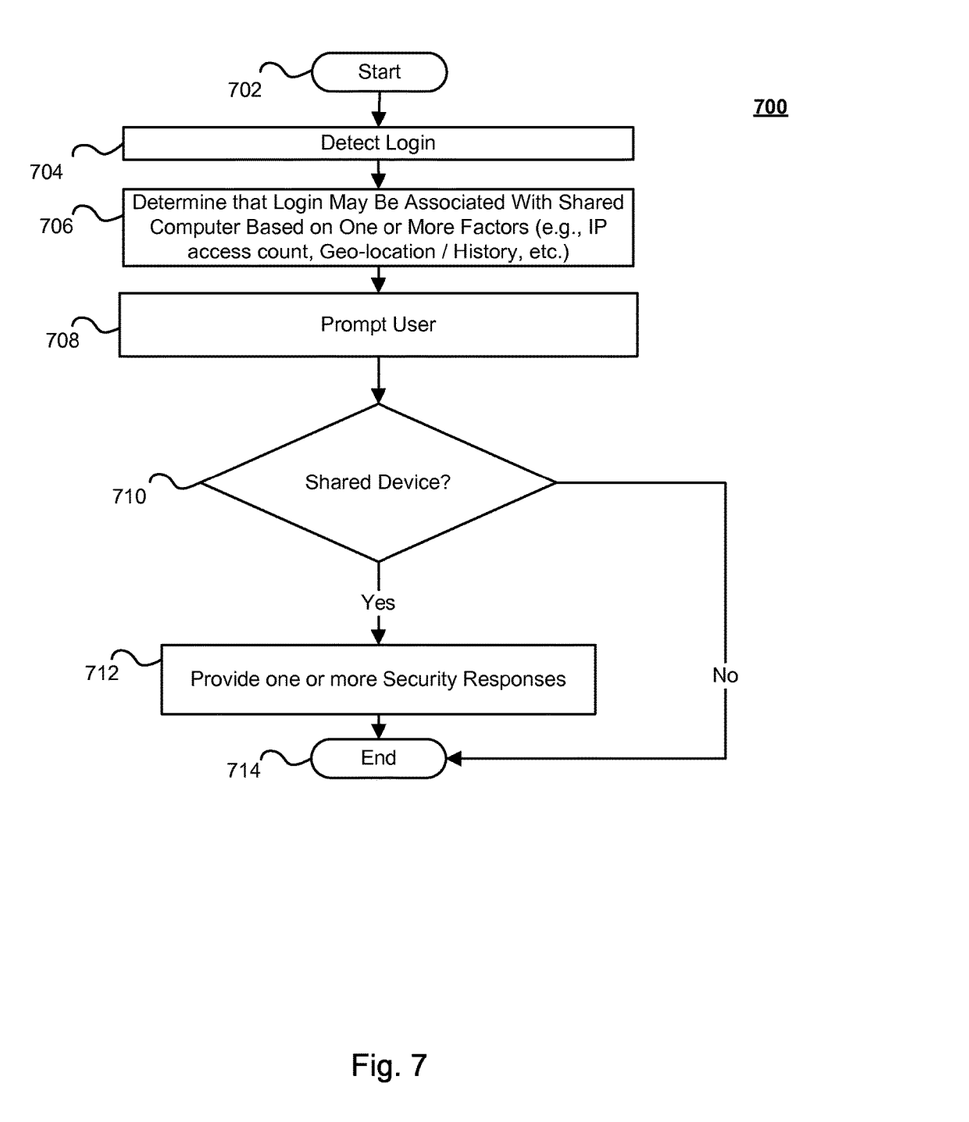
FIG. 7 depicts a method for detecting shared devices in accordance with an embodiment of the present disclosure.

Referring to FIG. 7, there is depicted a method 700 for detecting shared devices in accordance with an embodiment of the present disclosure. At block 702, the method 700 may begin.

At block 704, a login or other website access may be detected.

At block 706, one or more techniques may be used to determine whether a device may be shared. For example, a count of logins associated with an IP address may be used. A login or session initiated from a geo-location different from historical logins of a user or different from current geo-location data of a mobile device associated with a user may be detected.

At block 708 a user may be prompted to confirm whether a device is a shared device.

A determination may be made based on a user response at block 710 and/or other factors. If it is determined to be a shared device, a cookie may be set or other data indicating a shared device may be stored local to the device and/or remote from the device. If it is a shared device, the method may continue at block 712. If it is not a shared device, the method may end at block 714.

At block 712, one or more security responses may be provided as described above in reference to block 408 of FIG. 4.

At block 714, the method 700 may end.

At this point it should be noted that detecting shared devices in accordance with the present disclosure as described above typically involves the processing of input data and the generation of output data to some extent. This input data processing and output data generation may be implemented in hardware or software. For example, specific electronic components may be employed in a shared device detection module or similar or related circuitry for implementing the functions associated with detecting shared devices in accordance with the present disclosure as described above. Alternatively, one or more processors operating in accordance with instructions may implement the functions associated with detecting shared devices in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for detecting shared devices comprising:
receiving, using a shared computer detection component, information about a connection to a website from a user device;
identifying, using the shared computer detection component, one or more characteristics associated with the connection from the user device;
determining, in the event there is sufficient data based on the one or more characteristics associated with the connection from the user device, whether the user device is a single shared network access device, wherein determining whether the user device is a shared device comprises:
identifying multiple unique identifiers associated with logins to the user device at different times;
determining a number of different identified login requests from the user device, wherein said determining comprises:
hashing one or more login names; and
counting a number of different hashed login names of the one or more hashed login names; and
calculating a first responsive action in the event it is determined that the user device is a shared device.

2. The method of claim 1, wherein the data based on the one or more characteristics associated with the connection comprises a login name.

3. The method of claim 1, wherein determining whether the user device is a shared device comprises determining whether a number of different identified login requests from the user device meets a specified threshold.

4. The method of claim 1, further comprising:
storing, locally associated with the shared device, a unique anonymous indicator of the login name based on the hashed login name.

5. The method of claim 1, further comprising:
storing, remote from the shared device, a unique anonymous indicator of the login name based on the hashed login name and an identifier of the user device.

6. The method of claim 1, wherein determining different identified login requests comprises:
dividing the hashed login name by a specified number;
obtaining a modulo of the division; and
setting a bit corresponding to the obtained modulo.

7. The method of claim 1, wherein the one or more characteristics of the connection comprise an IP Address associated with the user device.

8. The method of claim 1, wherein the one or more characteristics of the connection comprise one or more characteristics of a browser associated with the user device, wherein said one or more characteristics of the browser comprise one or more of a screen resolution, a font list, associated plug-ins and versions, a time zone, and Multipurpose Internet Mail Extensions (MIME) types.

9. The method of claim 1, wherein determining whether the user device is a shared device comprises:
determining an IP address associated with the user device;
identifying one or more web browser characteristics of a web browser associated with the user device;
counting a number of unique sessions at the website, wherein the sessions are associated with the IP address and the web browser having the one or more web browser characteristics; and
determining whether the number of unique sessions exceeds a specified threshold.

10. The method of claim 1, further comprising performing the first responsive action.

11. The method of claim 10, wherein the first responsive action includes at least one of:
shortening a duration of a session associated with the website, using no caching headers for one or more HTTP responses, disabling a user option to remain signed in, disabling a user option to be remembered, limiting an amount of personally identifiable information displayed as a default, limiting an amount of sensitive personal information displayed as a default, limiting an amount of financial information displayed as a default, requiring additional authentication for a transaction, disabling functionality allowing restoration of a backup, disabling functionality allowing deletion of content, providing a warning to the user via a mobile device associated with the user, requiring an authentication from the user via a mobile device associated with the user, denying access to the website, logging the user out, terminating a session at the website, notifying an administrator, deleting browser history on logout, and logging one or more events associated with the connection.

12. The method of claim 1, further comprising:
determining that the data based on the one or more characteristics associated with the connection from the user device indicates a potential shared device; and
determining a second responsive action in the event that the data based on the one or more characteristics associated with the connection from the user device is insufficient to determine that the user device is a shared device.

13. The method of claim 12, wherein determining that the data based on the one or more characteristics associated with the connection from the user device indicates a potential shared computer comprises:
  determining that a number of connections from a same IP address exceeds a specified threshold.

14. The method of claim 1,
  further comprising determining that the data based on the one or more characteristics associated with the connection from the user device indicates a potential shared device; and
  wherein determining that the data based on the one or more characteristics associated with the connection from the user device indicates a potential shared computer comprises:
  determining that an IP address of the user device is associated with a geo-location not historically associated with the login.

15. The method of claim 12, wherein the second responsive action comprises at least one of: prompting the user to confirm whether a user device is a shared device, logging the user out, notifying an administrator, and logging one or more events associated with the connection.

16. The method of claim 1, wherein the determination is performed by at least one of: a third party identification provider, a network security vendor, the website, a browser on the user device, and an agent resident on the user device.

17. At least one non-transitory processor readable storage medium storing a computer program of instructions configured to be readable by at least one processor for instructing the at least one processor to execute a computer process for performing the method as recited in claim 1.

18. An article of manufacture for detecting shared devices, the article of manufacture comprising:
  at least one non-transitory processor readable storage medium; and
  instructions stored on the at least one non-transitory processor readable storage medium;
  wherein the instructions are configured to be readable from the at least one non-transitory processor readable storage medium by at least one computer processor and thereby cause the at least one computer processor to operate so as to:
    receive, using a shared computer detection component, information about a connection to a website from a user device;
    identify, using the shared computer detection component, one or more characteristics associated with the connection from the user device;
    determine, in the event there is sufficient data based on the one or more characteristics associated with the connection from the user device, whether the user device is a single shared network access device, wherein determining whether the user device is a shared device comprises:
      identifying multiple unique identifiers associated with logins to the user device at different times;
      determining a number of different identified login requests from the user device, wherein said determining comprises:
        hashing one or more login names; and
        counting a number of different hashed login names of the one or more hashed login names; and
    calculate a first responsive action in the event it is determined that the user device is a shared device.

19. A system for detecting shared devices comprising:
  one or more computer processors communicatively coupled to a network; wherein the one or more computer processors are configured to:
    receive, using a shared computer detection component, information about a connection to a website from a user device;
    identify, using the shared computer detection component, one or more characteristics associated with the connection from the user device;
    determine, in the event there is sufficient data based on the one or more characteristics associated with the connection from the user device, whether the user device is a single shared network access device, wherein determining whether the user device is a shared device comprises:
      identifying multiple unique identifiers associated with logins to the user device at different times;
      determining a number of different identified login requests from the user device, wherein said determining comprises:
        hashing one or more login names; and
        counting a number of different hashed login names of the one or more hashed login names; and
    calculate a first responsive action in the event it is determined that the user device is a shared device.

* * * * *